United States Patent
Kinoshita et al.

(10) Patent No.: US 6,228,962 B1
(45) Date of Patent: May 8, 2001

(54) METHODS OF USING CEMENT DISPERSANTS FOR PRODUCING CONCRETE

(75) Inventors: Mitsuo Kinoshita; Kazuhisa Okada, both of Aichi (JP)

(73) Assignee: Takemoto Yushi Kabushiki Kaisha (JP)

( * ) Notice: Subject to any disclaimer, the term of this patent is extended or adjusted under 35 U.S.C. 154(b) by 0 days.

(21) Appl. No.: 09/615,173

(22) Filed: Jul. 13, 2000

Related U.S. Application Data

(62) Division of application No. 09/208,329, filed on Dec. 9, 1998, now Pat. No. 6,140,440.

(30) Foreign Application Priority Data

Dec. 16, 1997 (JP) .................................. 9-364183

(51) Int. Cl.⁷ .................................. C08F 230/04

(52) U.S. Cl. .................. 526/240; 526/287; 526/318.4; 526/320; 526/328.5; 526/332; 106/725; 106/809; 524/5

(58) Field of Search .................. 106/725, 809; 524/5; 526/240, 287, 318.4, 328.5, 332

(56) References Cited

U.S. PATENT DOCUMENTS

| | | | |
|---|---|---|---|
| 4,962,173 | * 10/1990 | Kinoshita et al. | 526/240 |
| 5,087,648 | * 2/1992 | Kinoshita et al. | 524/3 |
| 5,290,869 | * 3/1994 | Kinoshita et al. | 525/291 |
| 5,362,829 | * 11/1994 | Kinoshita et al. | 526/240 |

* cited by examiner

Primary Examiner—Helen L. Pezzuto
(74) Attorney, Agent, or Firm—Coudert Brothers

(57) ABSTRACT

Cement dispersants which contain two specified kinds of water-soluble vinyl copolymers mixed at a specified ratio can produce cement compositions such as concrete with water/cement ratio of 20–40 weight % with a reduced slump loss and provide a high early strength.

8 Claims, No Drawings

METHODS OF USING CEMENT DISPERSANTS FOR PRODUCING CONCRETE

This is a division of application Ser. No. 09/208,329, filed Dec. 9, 1998 now U.S. Pat. No. 6,140,440

BACKGROUND OF THE INVENTION

This invention relates to methods of using cement dispersants to produce better concrete. At work sites where cement compositions are used, it is important to be able to provide high fluidity to cement compositions, to reduce the drop in the provided fluidity with time ("the slump loss") and to obtain a sufficient early strength during the initial period of hardening such that the frames can be removed quickly and the work efficiency can be thereby improved. This invention relates to cement dispersants which can respond to such requirements, as well as methods of using such cement dispersants to produce concrete with improved quality.

Examples of prior art cement dispersant for providing fluidity to cement compositions include salts of high condensates of naphthalene sulfonic acid formaldehyde and melamine sulfonic acid formaldehyde, as well as water-soluble vinyl copolymers. Cement compositions prepared by using salts of high condensates of naphthalene sulfonic acid formaldehyde or melamine sulfonic acid formaldehyde, however, have the problem of a high slump loss. Those prepared by using water-soluble vinyl copolymers of the conventionally proposed kind (such as disclosed in Japanese Patent Publications Tokko 58-38380, 59-18338 and 5-11057 and U.S. Pat. Nos. 4,962,173, 5,087,648, 5,290,869 and 5,362,829) have smaller slump losses but there are problems wherein their setting times become longer and hence a sufficient early strength cannot be obtained during the early period of hardening. This problem is particularly significant with high-strength cement compositions with a limited water-to-cement ratio.

SUMMARY OF THE INVENTION

The problem to be overcome by the present invention is that prior art cement dispersants could produce only cement compositions with a large slump loss or incapable of providing a sufficiently large early strength, this problem being particularly significant with high-strength cement compositions with a limited water-to-cement ratio.

The present invention was accomplished as a result of investigations by the present inventors and is based on their discovery that the aforementioned problems can be responded to if two specified kinds of water-soluble vinyl copolymers are mixed at a specified ratio.

DETAILED DESCRIPTION OF THE INVENTION

This invention relates to methods of using cement dispersants comprised of Component (a) and Component (b) to be described below at weight ratio ((a)/(b)) of 99/1–70/30, wherein Component (a) is a water-soluble vinyl copolymer with number average molecular weight 3500–50000, having as its constituent units Unit A shown below by Formula (1) by 55–80 molar %, Unit B shown below by Formula (2) by 2–25 molar %, Unit C shown below by Formula (3) by 3–20 molar % and Unit D shown below by Formula (4) by 1–15 molar % (the total being 100 molar %) and wherein Component (b) is another water-soluble vinyl copolymer with number average molecular weight 1500–25000, having as its constituent units Unit A shown below by Formula (1) by 45–80 molar %, Unit B shown below by Formula (2) by 2–15 molar %, Unit C shown below by Formula (3) by 4–20 molar % and Unit E shown below by Formula (5) by 10–40 molar % (the total being 100 molar %), Formulas (1)–(5) being as follows:

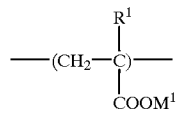
(Formula 1)

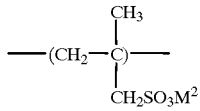
(Formula 2)

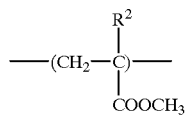
(Formula 3)

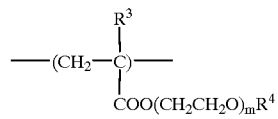
(Formula 4)

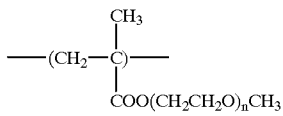
(Formula 5)

where $R^1$, $R^2$ and $R^3$ are each either H or $CH_3$, $R^4$ is an alkyl group with 1–3 carbon atoms, $M^1$ and $M^2$ are each an alkali metal, an alkali earth metal, ammonium or an organic amine, m is an integer 51–105, and n is an integer 5–25.

In summary, a cement dispersant according to this invention is characterized as containing both aforementioned Components (a) and (b). Component (a) is a water-soluble vinyl polymer having Units A, B, C and D as its constituent units at a specified ratio, and Component (b) is another water-soluble vinyl polymer having Units A, B, C and E as its constituent units at another specified ratio. Both in Components (a) and (b), each Unit A, B, C, D or E is formed by copolymerizing its corresponding vinyl monomers.

Examples of vinyl monomers which form Unit A shown by Formula (1) include (1) alkali metal salts, alkali earth metal salts and organic amine salts of methacrylic acid, and (2) alkali metal salts, alkali earth metal salts and organic amine salts of acrylic acid. Of these, alkali metal salts such as sodium and potassium salts of methacrylic acid are preferred.

Examples of vinyl monomers which form Unit B shown by Formula (2) include alkali metal salts, alkali earth metal salts and organic amine salts of methallyl sulfonic acid. Of these, alkali metal salts such as sodium and potassium salts of methallyl sulfonic acid are preferred.

Examples of vinyl monomers which form Unit C shown by Formula (3) include methyl acrylate and methyl methacrylate.

Examples of vinyl monomers which form Unit D shown by Formula (4) include alkoxy polyethoxy ethyl (meth) acrylates with 1–3 carbon atoms and the repetition number of oxyethylene units 51–105, such as methoxy polyethoxy ethyl (meth)acrylates, ethoxy polyethoxy ethyl (meth) acrylates, and n-propoxy polyethoxy ethyl (meth)acrylates. Of these, methoxy polyethoxy ethyl methacrylates with the repetition number of oxyethylene units 55–95 are preferred.

Examples of vinyl monomers which form Unit E shown by Formula (5) include methoxy polyethoxy ethyl methacrylates with the repetition number of oxyethylene units 5–25. Of these, those with the repetition number of oxyethylene units 7–23 are preferred.

The water-soluble vinyl copolymers of Component (a) are obtained by radical copolymerization of vinyl monomers forming Units A–D at a specified copolymerization ratio in the presence of a radical initiator. The radical copolymerization is carried out by aqueous solution polymerization using water or a mixed solvent with water and a water-soluble organic solvent. Explained more in detail, each of the vinyl monomers are initially dissolved in water to prepare an aqueous solution containing these vinyl monomers by 10–45 weight % as their total. Next, a radical initiator is added to this aqueous solution within a nitrogen gas atmosphere to carry out a radical copolymerization reaction at 50–70° C. for 5–8 hours and to thereby obtain water-soluble vinyl copolymer. Any radical initiator which generates radicals by decomposing at the reaction temperature of copolymerization may be used for the copolymerization reaction of either of the vinyl monomers, but the use of a water-soluble radical initiator is preferred. Examples of such water-soluble radical initiator include persulfates such as potassium persulfate and ammonium persulfate, hydrogen peroxide, and 2,2-azobis (2-amidinopropane) dihydrochloride. They may be combined with a reducing agent such as a sulfite and L-ascorbic acid or amines to be used as a redox initiator.

The water-soluble vinyl copolymers of Component (a) thus obtained contain Unit A by 55–80 molar % (or preferably 55–75 molar %), Unit B by 2–25 molar % (or preferably 4–20 molar %), Unit C by 3–20 molar % (or preferably 5–15 molar %), and Unit D by 1–15 molar % (or preferably 2–12 molar %), the total being 100 molar %. Their number average molecular weight (hereinafter always pullulan converted by GPC method) is 3500–50000, and preferably 5000–40000.

The water-soluble vinyl copolymers of Component (b) can be obtained similarly as described above for those of Component (a). The water-soluble vinyl copolymers of Component (b), by contrast, contain Unit A by 45–80 molar % (or preferably 50–75 molar %), Unit B by 2–15 molar % (or preferably 3–13 molar %), Unit C by 4–20 molar % (or preferably 5–15 molar %), and Unit E by 10–40 molar % (or preferably 12–35 molar %), the total being 100 molar %. Their number average molecular weight is 1500–25000, and preferably 2500–20000.

Cement dispersants of this invention are characterized not only as comprising water-soluble vinyl copolymers of aforementioned Components (a) and (b) but also as containing Components (a) and (b) at a weight ratio ((a)/(b)) of 99/1–70/30, or preferably 97/3–75/25. If this weight ratio is greater than 99/1, the slump loss becomes too large. If this ratio is less than 70/30, the appearance of early strength becomes adversely affected.

For preparing a cement composition by using a cement dispersant of this invention, it is permissible to use another agent at the same time, depending on the purpose. Examples of such other agent to be used at the same time include air entraining agents, antifoaming agents, water-proofing agents, hardening accelerators and antiseptics. They may be added with the kneading water when the cement composition is prepared or after the cement composition has been mixed and kneaded.

Cement dispersants of this invention can be used for cement compositions such as mortars and concrete prepared by using a binder composed of cement or a mixture of cement and a microscopic powder admixture. Examples of cement which can be used include many kinds of portland cement such as ordinary portland cement, high early strength portland cement and moderate heat portland cement, blast furnace cement, fly ash cement, silica fume cement as well as many other kinds of blended cement. Examples of microscopic powder admixture include silica fume, blast-furnace slag and fly ash. Cement dispersants of this invention are normally mixed at a ratio of 0.05–2.0 weight parts, or preferably 0.1–1.5 weight parts, as converted to solid component per 100 weight parts of the binder comprised of cement or a mixture of cement and a microscopic powder admixture.

Cement dispersants of this invention are particularly characterized as using at a specified ratio both water-soluble vinyl copolymers of Component (a) which are comb-shaped graft copolymers with a relatively long polyoxyethylene graft chain and those of Component (b) which are comb-shaped graft copolymers with a relatively short polyoxyethylene graft chain. Cement dispersants of this invention with such particular characteristic are effective not only with ordinary cement compositions with the water/cement ratio in excess of 40% but also with cement compositions with the water/cement ratio 20–40% such as concrete. They can provide high fluidity even to high-strength concrete with the water/cement ratio limited to 20–40%, reduce the slump loss, limit the setting time delay and realize a sufficient early strength.

Six embodiments of the present invention will be described next.

Embodiment (1)

This is a cement dispersant having Component (a) and Component (b) as described below at weight ratio ((a)/(b)) of 85/15.

Component (a) is a water-soluble vinyl copolymer (a-1) of number average molecular weight 18900 with its total constituent units (total 100 molar %) consisting of 63 molar % of sodium methacrylate as Unit A, 13 molar % of sodium methallyl sulfonate as Unit B, 15 molar % of methyl acrylate as Unit C and 9 molar % of methoxy polyethoxy ethyl (v=75) methacylate as Unit D, where and hereinbelow v indicates the repetition number of oxyethylene units.

Component (b) is a water-soluble vinyl copolymer (b-1) of number average molecular weight 6100 with its total constituent units (total 100 molar %) consisting of 53 molar % of sodium methacrylate as Unit A, 5 molar % of sodium methallyl sulfonate as Unit B, 9 molar % of methyl acrylate as Unit C and 33 molar % of methoxy polyethoxy ethyl (v=9) methacylate as Unit E.

Embodiment (2)

This is a cement dispersant having Component (a) and Component (b) as described below at weight ratio ((a)/(b)) of 90/10.

Component (a) is the same as aforementioned water-soluble vinyl copolymer (a-1).

Component (b) is a water-soluble vinyl copolymer (b-2) of number average molecular weight 11500 with its total constituent units (total 100 molar %) consisting of 62 molar % of sodium methacrylate as Unit A, 10 molar % of sodium methallyl sulfonate as Unit B, 5 molar % of methyl acrylate as Unit C and 23 molar % of methoxy polyethoxy ethyl (v=23) methacylate as Unit E.

Embodiment (3)

This is a cement dispersant having Component (a) and Component (b) as described below at weight ratio ((a)/(b)) of 95/5.

Component (a) is the same as aforementioned water-soluble vinyl copolymer (a-1).

Component (b) is a water-soluble vinyl copolymer (b-3) of number average molecular weight 16700 with its total constituent units (total 100 molar %) consisting of 57 molar % of sodium methacrylate as Unit A, 3 molar % of sodium methallyl sulfonate as Unit B, 8 molar % of methyl acrylate as Unit C and 32 molar % of methoxy polyethoxy ethyl (v=9) methacylate as Unit E.

Embodiment (4)

This is a cement dispersant having Component (a) and Component (b) as described below at weight ratio ((a)/(b)) of 97/3.

Component (a) is a water-soluble vinyl copolymer (a-2) of number average molecular weight 12200 with its total constituent units (total 100 molar %) consisting of 55 molar % of sodium methacrylate as Unit A, 18 molar % of sodium methallyl sulfonate as Unit B, 15 molar % of methyl acrylate as Unit C and 12 molar % of methoxy polyethoxy ethyl (v=57) methacylate as Unit D.

Component (b) is the same as aforementioned water-soluble vinyl copolymer (b-1).

Embodiment (5)

This is a cement dispersant having Component (a) and Component (b) as described below at weight ratio ((a)/(b)) of 78/22.

Component (a) is a water-soluble vinyl copolymer (a-3) of number average molecular weight 35000 with its total constituent units (total 100 molar %) consisting of 75 molar % of sodium methacrylate as Unit A, 14 molar % of sodium methallyl sulfonate as Unit B, 7 molar % of methyl acrylate as Unit C and 4 molar % of methoxy polyethoxy ethyl (v=92) methacylate as Unit D.

Component (b) is the same as aforementioned water-soluble vinyl copolymer (b-1).

Embodiment (6)

This is a cement dispersant having Component (a) and Component (b) as described below at weight ratio ((a)/(b)) of 78/22.

Component (a) is a water-soluble vinyl copolymer (a-4) of number average molecular weight 9200 with its total constituent units (total 100 molar %) consisting of 68 molar % of sodium methacrylate as Unit A, 6 molar % of sodium methallyl sulfonate as Unit B, 12 molar % of methyl acrylate as Unit C and 14 molar % of isopropoxy polyethoxy ethyl (v=55) methacylate as Unit D.

Component (b) is the same as aforementioned water-soluble vinyl copolymer (b-1).

EXAMPLES

The invention will be described next by way of examples but these examples are not intended to limit the scope of the invention. In what follows, "parts" shall mean "weight parts" and "%" shall mean "weight % excluding the weight of air", unless otherwise noted.

Part 1 (Synthesis of Water-soluble Vinyl Copolymers of Components (a) and (b))

Synthesis of (a-1)

Methacrylic acid 107 parts (1.24 moles), methoxy polyethoxy ethyl (v=75) methacrylate 612 parts (0.18 moles), sodium methallyl sulfonate 44 parts (0.28 moles), methyl acrylate 26 parts (0.30 moles) and water 900 parts were placed inside a reactor vessel, and after a 30% water solution of sodium hydroxide 165 parts was added for neutralization and a uniform solution was obtained, the atmosphere was replaced with nitrogen gas. The temperature of the reacting system was maintained at 60° C. by means of a temperature bath and a polymerization process was started by adding a 20% water solution of sodium persulfate 60 parts. The polymerization process was continued for 6 hours to conclude the polymerization. Thereafter, a 30% water solution of sodium hydroxide 7 parts was added in order to neutralize the acid products of decomposition. A portion of the product thus obtained was condensed inside an evaporator, precipitated and refined inside a mixed acetone/isopropanol solvent and dried to obtain water-soluble vinyl copolymer (a-1). This water-soluble vinyl copolymer (a-1) was analyzed by NMR, elemental analysis, titration method and GPC and was found to be a water-soluble vinyl copolymer with number average molecular weight 18900 having constituent units of sodium methacylate, sodium methallyl sulfonate, methyl acrylate and methoxy polyethoxy ethyl (v=75) methacrylate at 63/13/15/9 (in molar % with total 100 molar %).

Synthesis of (a-2)–(a-4) and (ar-1)–(ar-8)

Water-soluble vinyl copolymers (a-2)–(a-4) and (ar-1)–(ar-8) were obtained similarly as described above for obtaining (a-1). Table 1 describes these copolymers.

Synthesis of (b-1)–(b-3) and (br-1)–(br-6)

Water-soluble vinyl copolymers (b-1)–(b-3) and (br-1)–(br-6) were obtained similarly as described above for obtaining (a-1). Table 2 describes these copolymers.

TABLE 1

| Comp. (a) | Constituent units and ratios (Kind/Molar %) | | | | | Number Average Molecular Weight |
|---|---|---|---|---|---|---|
| | Unit A | Unit B | Unit C | Unit D | Other unit | |
| a-1 | am-1/63 | bm-1/13 | cm-1/15 | dm-1/9 | | 18900 |
| a-2 | am-1/55 | bm-1/18 | cm-1/15 | dm-2/12 | | 12200 |
| a-3 | am-1/75 | bm-1/14 | cm-1/7 | dm-3/4 | | 35000 |
| a-4 | am-2/68 | bm-1/6 | cm-1/12 | dm-4/14 | | 9200 |
| ar-1 | am-1/65 | | | dm-1/35 | | 25700 |
| ar-2 | am-1/44 | bm-1/25 | cm-1/20 | dm-1/11 | | 8500 |
| ar-3 | am-1/60 | bm-1/15 | cm-1/15 | | dm-5/10 | 16500 |
| ar-4 | am-1/70 | bm-1/15 | cm-1/10 | | dm-6/5 | 31000 |
| ar-5 | am-1/60 | | cm-1/15 | dm-1/10 | rm-1/15 | 32000 |
| ar-6 | am-1/50 | bm-1/15 | | dm-2/20 | rm-2/15 | 15000 |
| ar-7 | am-1/70 | bm-1/2 | cm-1/18 | dm-1/10 | | 65000 |
| ar-8 | am-2/55 | bm-1/28 | cm-1/10 | dm-2/7 | | 3100 |

TABLE 2

| Comp. (b) | Constituent units and ratios (Kind/Molar %) | | | | | Number Average Molecular Weight |
|---|---|---|---|---|---|---|
| | Unit A | Unit B | Unit C | Unit E | Other unit | |
| b-1 | am-1/53 | bm-1/5 | cm-1/9 | dm-7/33 | | 6100 |
| b-2 | am-1/62 | bm-1/10 | cm-1/5 | dm-8/23 | | 11500 |
| b-3 | am-1/57 | bm-1/3 | cm-1/8 | dm-7/32 | | 16700 |
| br-1 | am-1/70 | | | dm-7/30 | | 13000 |
| br-2 | am-1/33 | bm-1/10 | | dm-7/57 | | 7500 |
| br-3 | am-1/50 | bm-1/2 | cm-1/8 | dm-7/40 | | 34000 |

TABLE 2-continued

| Comp. (b) | Constituent units and ratios (Kind/Molar %) | | | | | Number Average Molecular Weight |
|---|---|---|---|---|---|---|
| | Unit A | Unit B | Unit C | Unit E | Other unit | |
| br-4 | am-1/60 | bm-1/15 | cm-1/6 | dm-7/19 | | 1000 |
| br-5 | am-1/60 | | | dm-7/25 | rm-1/15 | 14000 |
| br-6 | am-2/55 | bm-1/12 | cm-1/13 | dm-9/20 | | 9800 |

Tables 1 and 2:

Comp.(a): Water-soluble vinyl copolymer of Composition (a)

Comp.(b): Water-soluble vinyl copolymer of Composition (b)

am-1: Sodium methacrylate
am-2: Sodium acrylate
bm-1: Sodium methallyl sulfonate
cm-1: Methyl acrylate
dm-1: Methoxy polyethoxy ethyl (v=75) methacrylate
dm-2: Methoxy polyethoxy ethyl (v=57) methacrylate
dm-3: Methoxy polyethoxy ethyl (v=92) methacrylate
dm-4: Isopropoxy polyethoxy ethyl (v=55) methacrylate
dm-5: Methoxy polyethoxy ethyl (v=42) methacrylate
dm-6: Methoxy polyethoxy ethyl (v=150) methacrylate
dm-7: Methoxy polyethoxy ethyl (v=9) methacrylate
dm-8: Methoxy polyethoxy ethyl (v=23) methacrylate
dm-9: Methoxy polyethoxy ethyl (v=38) methacrylate
rm-1: Sodium styrene sulfonate
rm-2: 2-hydroxyethyl methacrylate Part 2 (Preparation of Cement Dispersants)

A 30% aqueous solution of water-soluble vinyl copolymer (a-1) 850 parts and a 30% aqueous solution of water-soluble vinyl copolymer (b-1) 150 parts were placed inside a 2-liter flask and sufficiently mixed together at room temperature until they become uniform to obtain a 30% aqueous solution of cement dispersant (Test Example 1).

Similarly, 30% aqueous solutions of cement dispersant (Test Examples 2–6 and Comparison Examples 1–20) were obtained by using different amounts of different kinds of water-soluble vinyl copolymers as shown in Table 3.

TABLE 3

| Example | Component (a) | | Component (b) | |
|---|---|---|---|---|
| | Kind | Amount Used (Part) | Kind | Amount Used (Part) |
| Test Examples | | | | |
| 1 | a-1 | 85 | b-1 | 15 |
| 2 | a-1 | 90 | b-2 | 10 |
| 3 | a-1 | 95 | b-3 | 5 |
| 4 | a-2 | 97 | b-1 | 3 |
| 5 | a-3 | 78 | b-1 | 22 |
| 6 | a-4 | 90 | b-1 | 10 |
| Comparison Examples | | | | |
| 1 | ar-1 | 85 | b-1 | 15 |
| 2 | ar-2 | 85 | b-1 | 15 |
| 3 | ar-3 | 85 | b-1 | 15 |
| 4 | ar-4 | 85 | b-1 | 15 |
| 5 | ar-5 | 85 | b-1 | 15 |
| 6 | ar-6 | 85 | b-1 | 15 |
| 7 | ar-7 | 85 | b-1 | 15 |
| 8 | ar-8 | 85 | b-1 | 15 |
| 9 | ar-1 | 85 | b-2 | 15 |
| 10 | a-1 | 85 | br-1 | 15 |
| 11 | a-1 | 85 | br-2 | 15 |
| 12 | a-1 | 85 | br-3 | 15 |
| 13 | a-1 | 85 | br-4 | 15 |
| 14 | a-1 | 85 | br-5 | 15 |
| 15 | a-1 | 85 | br-6 | 15 |
| 16 | a-1 | 99.5 | b-1 | 0.5 |
| 17 | a-1 | 65 | b-1 | 35 |
| 18 | a-2 | 60 | b-2 | 40 |
| 19 | ar-1 | 100 | — | — |
| 20 | — | — | b-1 | 100 |

Part 3 (Preparation and Evaluation of Concrete)

Each of the test examples of concrete was prepared by placing ordinary portland cement (specific weight=3.16, Braine value=3300), fine aggregates (sand from Ooi River with specific weight=2.62) and coarse aggregates (crushed stone from Okazaki with specific weight=2.66) sequentially into a 50-liter pan-type forced kneading mixer under the conditions shown in Table 4 and kneaded for 15 seconds. Next, the cement dispersants prepared in Part 2 were added together with kneading water at a rate of 0.1–1.5 weight % with respect to the cement converted to solid components such that the target slump value would be within the range of 21±1 cm and the mixture was kneaded for 2 minutes. An agent for controlling the amount of air was kneaded in with water in each case such that the target air content would become 4.0–5.0%.

TABLE 4

| Condition No. for preparation | Water/cement ratio (%) | Sand-coarse aggregate ratio | Used materials (kg/m$^3$) | | | |
|---|---|---|---|---|---|---|
| | | | Water | Cement | F.A. | C.A. |
| 1 | 33 | 44 | 165 | 500 | 742 | 944 |
| 2 | 50 | 49 | 165 | 330 | 867 | 960 |

In Table 4:
F.A.: Fine aggregates
C.A.: Coarse aggregates

For each of test and comparison examples, slump value (SV), air quantity (AQ), setting time and compression strength were measured according respectively to JIS-A1101, JIS-A1128, JIS-A6204 and JIS-A1108 immediately after the kneading (t=0), 60 minutes later (t=60) and 90 minutes later (t=90). The results are shown in Tables 5–8. In these Tables, the numbers in parentheses following the test and comparison example numbers indicate the condition of preparation defined in Table 4. Slump ratio is defined as the percentage ratio of the slump value after 90 minutes to the slump value immediately after the kneading.

These tables clearly show that cement dispersants according to this invention can provide a high level of fluidity while limiting the slump loss, as well as a high early strength at the initial period of hardening.

TABLE 5

| Test No. | Cement dispersant Kind | Amount (*1) | t = 0 SV (cm) | t = 0 AQ (%) | t = 60 SV (cm) | t = 60 AQ (%) | t = 90 SV (cm) | t = 90 AQ (%) | Slump Ratio (%) |
|---|---|---|---|---|---|---|---|---|---|
| | | | Test Examples | | | | | | |
| 1 | 1(1) | 0.17 | 21.5 | 4.5 | 20.8 | 4.4 | 20.4 | 4.4 | 94.9 |
| 2 | 2(1) | 0.18 | 21.3 | 4.6 | 20.5 | 4.4 | 19.9 | 4.2 | 93.4 |
| 3 | 3(1) | 0.19 | 21.6 | 4.4 | 20.3 | 4.3 | 19.6 | 4.3 | 90.7 |
| 4 | 4(1) | 0.16 | 21.4 | 4.5 | 20.0 | 4.6 | 19.3 | 4.6 | 90.2 |
| 5 | 5(1) | 0.20 | 21.7 | 4.7 | 20.5 | 4.5 | 20.3 | 4.4 | 93.5 |
| 6 | 6(1) | 0.21 | 21.5 | 4.4 | 20.2 | 4.4 | 19.7 | 4.2 | 91.6 |
| 7 | 1(2) | 0.16 | 21.3 | 4.5 | 20.5 | 4.3 | 19.6 | 4.0 | 92.0 |
| 8 | 2(2) | 0.18 | 21.5 | 4.3 | 20.3 | 4.1 | 19.7 | 4.1 | 91.6 |
| 9 | 3(2) | 0.20 | 21.6 | 4.5 | 20.5 | 4.5 | 19.5 | 4.3 | 90.3 |
| 10 | 4(2) | 0.19 | 21.3 | 4.6 | 19.4 | 4.4 | 18.7 | 4.2 | 87.8 |
| 11 | 5(2) | 0.17 | 21.4 | 4.6 | 20.6 | 4.6 | 19.9 | 4.4 | 93.0 |
| 12 | 6(2) | 0.20 | 21.0 | 4.7 | 19.8 | 4.6 | 18.8 | 4.4 | 89.5 |

(*1): The amount of cement dispersant is shown as converted to solid components with respect to 100 parts of cement.
(1), (2): Condition No. for preparation of concrete

TABLE 6

| Test No. | Cement dispersant Kind | Amount (*1) | t = 0 SV (cm) | t = 0 AQ (%) | t = 60 SV (cm) | t = 60 AQ (%) | t = 90 SV (cm) | t = 90 AQ (%) | Slump Ratio (%) |
|---|---|---|---|---|---|---|---|---|---|
| | | | Comparison Examples | | | | | | |
| 13 | 1(1) | 0.28 | 21.7 | 4.7 | 16.5 | 4.5 | 14.3 | 4.3 | 65.9 |
| 14 | 2(1) | 0.35 | 21.5 | 4.5 | 17.8 | 4.3 | 15.7 | 4.3 | 73.0 |
| 15 | 3(1) | 0.24 | 21.3 | 4.4 | 17.9 | 4.4 | 16.0 | 4.2 | 75.1 |
| 16 | 4(1) | 0.47 | 21.2 | 4.8 | 12.3 | 4.6 | 10.5 | 4.5 | 49.5 |
| 17 | 5(1) | 0.60 | 21.4 | 4.5 | 11.5 | 4.4 | 9.8 | 4.1 | 45.8 |
| 18 | 6(1) | 0.45 | 21.5 | 4.6 | 14.9 | 4.5 | 12.1 | 4.2 | 56.2 |
| 19 | 7(1) | 1.0 | (*2) | — | — | — | — | — | — |
| 20 | 8(1) | 0.38 | 21.4 | 4.3 | 17.2 | 4.1 | 14.5 | 4.0 | 67.8 |
| 21 | 9(1) | 0.30 | 21.8 | 4.7 | 17.6 | 4.7 | 15.0 | 4.5 | 68.8 |
| 22 | 10(1) | 0.23 | 21.6 | 4.6 | 15.4 | 4.6 | 12.4 | 4.4 | 57.4 |
| 23 | 11(1) | 0.29 | 21.4 | 4.4 | 14.2 | 4.4 | 11.6 | 4.1 | 54.2 |
| 24 | 12(1) | 0.31 | 21.5 | 4.5 | 14.6 | 4.5 | 11.2 | 4.3 | 52.1 |
| 25 | 13(1) | 0.24 | 21.3 | 4.7 | 12.5 | 4.3 | 10.3 | 4.0 | 48.4 |
| 26 | 14(1) | 0.27 | 21.7 | 4.4 | 12.3 | 4.4 | 10.1 | 4.3 | 46.5 |
| 27 | 15(1) | 0.25 | 21.4 | 4.5 | 15.0 | 4.3 | 12.7 | 4.1 | 59.3 |
| 28 | 16(1) | 0.18 | 21.8 | 4.7 | 16.5 | 4.5 | 13.1 | 4.5 | 60.1 |
| 29 | 17(1) | 0.24 | 21.7 | 4.6 | 18.9 | 4.5 | 17.5 | 4.3 | 80.6 |
| 30 | 18(1) | 0.26 | 21.5 | 4.4 | 18.0 | 4.2 | 16.3 | 4.1 | 75.8 |
| 31 | 19(1) | 0.25 | 21.6 | 4.8 | 16.4 | 4.7 | 13.5 | 4.5 | 62.5 |
| 32 | 20(1) | 0.35 | 21.3 | 4.3 | 17.8 | 4.3 | 16.0 | 4.2 | 75.1 |
| 33 | (*3)(1) | 0.75 | 21.6 | 4.7 | 11.3 | 4.5 | 9.1 | 4.4 | 42.1 |
| 34 | 1(2) | 0.26 | 21.4 | 4.5 | 16.2 | 4.3 | 12.3 | 4.3 | 57.5 |
| 35 | 5(2) | 0.52 | 21.6 | 4.4 | 14.1 | 4.4 | 10.6 | 4.1 | 49.1 |
| 36 | 10(2) | 0.22 | 21.8 | 4.6 | 17.0 | 4.6 | 13.6 | 4.5 | 62.4 |
| 37 | 16(2) | 0.17 | 21.5 | 4.7 | 15.3 | 4.4 | 11.5 | 4.1 | 53.5 |
| 38 | 19(2) | 0.21 | 21.4 | 4.3 | 13.6 | 4.2 | 10.2 | 4.2 | 47.6 |
| 39 | 20(2) | 0.22 | 21.2 | 4.6 | 18.5 | 4.5 | 16.8 | 4.3 | 79.2 |

(*1): The amount of cement dispersant is shown as converted to solid components with respect to 100 parts of cement.
(*2): No measurement was taken because the slump value at t = 0 did not reach a target level although the amount of the cement dispersant was adjusted.
(*3): Salt of high condensates of naphthalene sulfonic acid formaldehyde.
(1), (2): Condition No. for preparation of concrete.

TABLE 7

| Test No. | Setting Time Start (min) | Setting Time End (min) | Compressive Strength (N/mm²) Time (8 h) | Time (12 h) | Time (18 h) | Time (24 h) | Time (72 h) |
|---|---|---|---|---|---|---|---|
| 1 | 315 | 395 | 1.8 | 9.6 | 22.0 | 35.5 | 53.0 |
| 2 | 315 | 390 | 2.0 | 10.1 | 22.6 | 40.7 | 54.4 |
| 3 | 310 | 390 | 2.0 | 10.1 | 22.4 | 39.5 | 54.0 |
| 4 | 305 | 380 | 2.3 | 11.7 | 25.3 | 43.2 | 55.3 |
| 5 | 330 | 410 | 1.6 | 9.3 | 21.7 | 35.3 | 53.2 |
| 6 | 325 | 405 | 1.6 | 9.5 | 21.8 | 36.0 | 53.6 |
| 7 | 350 | 450 | 0.7 | 3.1 | 6.0 | 15.0 | 26.5 |
| 8 | 350 | 440 | 0.8 | 3.3 | 6.5 | 16.3 | 26.6 |
| 9 | 340 | 435 | 0.8 | 3.5 | 6.6 | 16.5 | 26.8 |
| 10 | 330 | 430 | 1.0 | 3.7 | 6.9 | 16.8 | 26.8 |
| 11 | 360 | 455 | 0.6 | 3.0 | 5.8 | 14.8 | 26.4 |
| 12 | 355 | 450 | 0.7 | 3.1 | 6.0 | 14.9 | 26.5 |

TABLE 8

| Test No. | Setting Time Start (min) | Setting Time End (min) | Compressive Strength (N/mm²) Time (8 h) | Time (12 h) | Time (18 h) | Time (24 h) | Time (72 h) |
|---|---|---|---|---|---|---|---|
| 13 | 400 | 510 | 0.1 | 1.1 | 9.3 | 14.6 | 42.4 |
| 14 | 390 | 495 | 0.3 | 1.3 | 10.5 | 15.7 | 44.1 |
| 15 | 395 | 500 | 0.2 | 1.2 | 9.6 | 15.0 | 43.3 |
| 16 | 370 | 465 | 0.5 | 1.8 | 11.3 | 16.9 | 45.9 |
| 17 | 420 | 545 | (*4) | 0.1 | 2.2 | 8.3 | 40.5 |
| 18 | 405 | 520 | (*4) | 0.5 | 8.8 | 10.1 | 42.0 |
| 19 | — | — | — | — | — | — | — |
| 20 | 410 | 510 | 0.1 | 1.0 | 8.9 | 14.2 | 42.5 |
| 21 | 385 | 495 | 0.3 | 1.4 | 10.7 | 15.8 | 44.5 |
| 22 | 385 | 475 | 0.6 | 2.0 | 12.6 | 18.1 | 45.3 |
| 23 | 380 | 460 | 0.7 | 2.2 | 13.0 | 19.0 | 45.9 |
| 24 | 375 | 460 | 0.7 | 2.2 | 13.3 | 19.5 | 46.0 |
| 25 | 430 | 550 | (*4) | — | 2.0 | 7.5 | 40.5 |
| 26 | 405 | 520 | (*4) | 0.6 | 9.0 | 11.0 | 42.8 |
| 27 | 380 | 465 | 0.8 | 2.7 | 13.9 | 19.3 | 45.8 |
| 28 | 320 | 400 | 1.6 | 9.1 | 21.0 | 35.0 | 51.5 |
| 29 | 375 | 465 | 0.7 | 2.1 | 13.0 | 18.8 | 45.2 |
| 30 | 385 | 470 | 0.5 | 1.7 | 12.4 | 17.9 | 45.0 |
| 31 | 415 | 520 | (*4) | 0.3 | 6.1 | 10.2 | 43.0 |
| 32 | 425 | 540 | (*4) | — | 2.8 | 8.4 | 40.3 |
| 33 | 350 | 440 | 0.9 | 3.5 | 16.6 | 29.7 | 52.0 |
| 34 | 425 | 545 | (*4) | — | 0.8 | 8.2 | 22.6 |
| 35 | 440 | 570 | (*4) | — | 0.1 | 1.5 | 20.2 |
| 36 | 410 | 530 | (*4) | — | 1.0 | 9.5 | 23.5 |
| 37 | 370 | 485 | 0.3 | 2.5 | 4.9 | 12.6 | 24.8 |
| 38 | 435 | 550 | (*4) | — | 0.5 | 7.0 | 22.0 |
| 39 | 440 | 560 | (*4) | — | 0.3 | 6.1 | 21.5 |

(*4): No measurement could be taken because there was no hardening.

What is claimed is:

1. A method of producing concrete, said method comprising the steps of preparing a cement dispersant and mixing cement, water and said cement dispersant at water-to-cement weight ratio of 20–40%, said cement dispersant comprising Component (a) and Component (b) at weight ratio ((a)/(b)) of 99/1–70/30, wherein Component (a) is a water-soluble vinyl copolymer with number average molecular weight 3500–50000, having as constituent units Unit A shown below by Formula (1) by 55–80 molar %, Unit B shown below by Formula (2) by 2–25 molar %, Unit C shown below by Formula (3) by 3–20 molar % and Unit D shown below by Formula (4) by 1–15 molar %, Units A, B, C and D totaling 100 molar %, and wherein Component (b) is another water-soluble vinyl copolymer with number average molecular weight 1500–25000, having as constituent units Unit A shown below by Formula (1) by 45–80 molar %, Unit B shown below by Formula (2) by 2–15 molar %, Unit C shown below by Formula (3) by 4–20 molar % and Unit E shown below by Formula (5) by 10–40 molar %, Units A, B, C and E totaling 100 molar %, Formulas (1)–(5) being as follows:

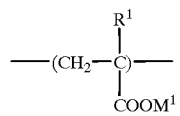
(Formula 1)

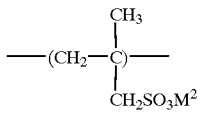
(Formula 2)

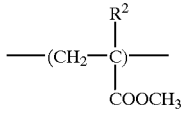
(Formula 3)

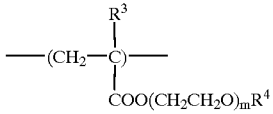
(Formula 4)

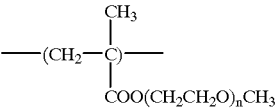
(Formula 5)

where $R^1$, $R^2$ and $R^3$ are each either H or $CH_3$, $R^4$ is an alkyl group with 1–3 carbon atoms, $M^1$ and $M^2$ are each an alkali metal, an alkali earth metal, ammonium or an organic amine, m is an integer 51–105, and n is an integer 5–25.

2. The method of claim 1 wherein said Component (a) is a water-soluble vinyl copolymer with number average molecular weight 5000–40000.

3. The method of claim 1 wherein said Component (b) is a water-soluble vinyl copolymer with number average molecular weight 2500–20000.

4. The method of claim 2 wherein said Component (b) is a water-soluble vinyl copolymer with number average molecular weight 2500–20000.

5. The method of claim 1 containing said Component (a) and said Component (b) at weight ratio ((a)/(b)) of 97/3–75/25.

6. The method of claim 2 containing said Component (a) and said Component (b) at weight ratio ((a)/(b)) of 97/3–75/25.

7. The method of claim 3 containing said Component (a) and said Component (b) at weight ratio ((a)/(b)) of 97/3–75/25.

8. The method claim 4 containing said Component (a) and said Component (b) at weight ratio ((a)/(b)) of 97/3–75/25.